(12) United States Patent
Patricks

(10) Patent No.: US 11,197,068 B1
(45) Date of Patent: Dec. 7, 2021

(54) METHODS AND SYSTEMS FOR INTERACTIVE QUEUING FOR SHARED LISTENING SESSIONS BASED ON USER SATISFACTION

(71) Applicant: Spotify AB, Stockholm (SE)

(72) Inventor: Mattias Anders Malte Patricks, Stockholm (SE)

(73) Assignee: Spotify AB, Stockholm (SE)

( * ) Notice: Subject to any disclaimer, the term of this patent is extended or adjusted under 35 U.S.C. 154(b) by 0 days.

(21) Appl. No.: 16/903,085

(22) Filed: Jun. 16, 2020

(51) Int. Cl.
*H04L 29/08* (2006.01)
*H04N 21/482* (2011.01)
*H04N 21/475* (2011.01)
*H04N 21/45* (2011.01)

(52) U.S. Cl.
CPC ..... *H04N 21/4825* (2013.01); *H04N 21/4532* (2013.01); *H04N 21/4755* (2013.01); *H04N 21/4826* (2013.01)

(58) Field of Classification Search
CPC ................ H04N 21/4825; H04N 21/4755
See application file for complete search history.

(56) References Cited

U.S. PATENT DOCUMENTS

| | | | |
|---|---|---|---|
| 5,758,259 A | 5/1998 | Lawler | |
| 5,801,747 A | 9/1998 | Bedard | |
| 5,848,398 A | 12/1998 | Martin et al. | |
| 6,005,597 A | 12/1999 | Barrett et al. | |
| 6,175,844 B1 | 1/2001 | Stolin | |
| 6,947,922 B1 | 9/2005 | Glance | |
| 9,160,786 B1 | 10/2015 | Jackson | |
| 9,432,429 B1 | 8/2016 | Ho | |
| 9,568,994 B2 | 2/2017 | Jehan | |
| 10,108,708 B2 | 10/2018 | O'Driscoll et al. | |
| 2002/0174428 A1 | 11/2002 | Agnihotri et al. | |

(Continued)

FOREIGN PATENT DOCUMENTS

| | | |
|---|---|---|
| EP | 0881591 A1 | 12/1998 |
| EP | 3543865 A1 | 9/2019 |

(Continued)

OTHER PUBLICATIONS

Spotify AB, International Search Report and Written Opinion, PCT/EP2016/057176, dated Jun. 14, 2016, 10 pgs.

(Continued)

*Primary Examiner* — Adnan M Mirza
(74) *Attorney, Agent, or Firm* — Morgan, Lewis & Bockius LLP

(57) ABSTRACT

An electronic device stores a shared playback queue for the shared playback session, the shared playback queue comprising one or more media content items, including a first media content item requested by a first user. While the shared playback queue includes the first media content item, the device receives a second request, from a second user, to add a second media content item to the shared playback queue. The device determines an order of the shared playback queue based at least in part on the musical preferences indicated in a profile of a third user of the plurality of users participating in the shared playback session. The device provides, for playback in the shared playback session, the first media content item and the second media content item based on the order of the shared playback queue.

20 Claims, 8 Drawing Sheets

(56) References Cited

U.S. PATENT DOCUMENTS

| | | |
|---|---|---|
| 2003/0160770 A1 | 8/2003 | Zimmerman |
| 2003/0208767 A1 | 11/2003 | Williamson et al. |
| 2006/0167576 A1 | 7/2006 | Rosenberg |
| 2006/0242661 A1 | 10/2006 | Bodlaender et al. |
| 2007/0100481 A1* | 5/2007 | Toms ............... G06F 16/64 700/94 |
| 2007/0233743 A1 | 10/2007 | Rosenberg |
| 2008/0091717 A1 | 4/2008 | Garbow |
| 2008/0166967 A1 | 7/2008 | McKillop |
| 2008/0261533 A1 | 10/2008 | Bengtsson |
| 2008/0309647 A1 | 12/2008 | Blose et al. |
| 2009/0063971 A1 | 3/2009 | White et al. |
| 2009/0210415 A1 | 8/2009 | Martin et al. |
| 2009/0002223 A1 | 9/2009 | Martin et al. |
| 2009/0217804 A1 | 9/2009 | Lu et al. |
| 2009/0300008 A1 | 12/2009 | Hangartner et al. |
| 2009/0307731 A1 | 12/2009 | Beyabani |
| 2010/0106799 A1 | 4/2010 | Calabrese |
| 2010/0205222 A1 | 8/2010 | Gajdos et al. |
| 2010/0325135 A1 | 12/2010 | Chen et al. |
| 2011/0004330 A1* | 1/2011 | Rothkopf ............. G06F 3/0482 700/94 |
| 2011/0106744 A1 | 5/2011 | Becker et al. |
| 2011/0162001 A1 | 6/2011 | Mehta et al. |
| 2011/0289155 A1 | 11/2011 | Pimazar |
| 2011/0295843 A1 | 12/2011 | Ingrassia, Jr. et al. |
| 2011/0314388 A1 | 12/2011 | Wheatley |
| 2012/0117026 A1 | 5/2012 | Cassidy |
| 2012/0117488 A1 | 5/2012 | Amidon et al. |
| 2012/0209954 A1 | 8/2012 | Wright |
| 2012/0290648 A1 | 11/2012 | Sharkey |
| 2012/0290653 A1 | 11/2012 | Sharkey |
| 2013/0018954 A1 | 1/2013 | Cheng |
| 2013/0031162 A1 | 1/2013 | Willis et al. |
| 2013/0198633 A1 | 8/2013 | Hyman |
| 2013/0297599 A1 | 11/2013 | Henshall |
| 2013/0297698 A1 | 11/2013 | Odero et al. |
| 2013/0346875 A1 | 12/2013 | Klein et al. |
| 2014/0031961 A1 | 1/2014 | Wansley et al. |
| 2014/0119407 A1 | 5/2014 | Miller |
| 2014/0123165 A1 | 5/2014 | Mukhenjee et al. |
| 2014/0223099 A1 | 8/2014 | Kidron |
| 2014/0245336 A1 | 8/2014 | Lewis, II et al. |
| 2014/0277649 A1 | 9/2014 | Chong et al. |
| 2015/0178624 A1 | 6/2015 | Chee et al. |
| 2015/0222680 A1 | 8/2015 | Grover |
| 2015/0277852 A1 | 10/2015 | Burgis |
| 2015/0356176 A1 | 12/2015 | Billinski et al. |
| 2016/0066038 A1 | 3/2016 | Chesluk et al. |
| 2016/0127777 A1 | 5/2016 | Roberts et al. |
| 2016/0156687 A1 | 6/2016 | Leung |
| 2016/0292269 A1 | 10/2016 | O'Driscoll et al. |
| 2016/0292272 A1 | 10/2016 | O'Driscoll et al. |
| 2016/0330794 A1 | 11/2016 | Ozcan |
| 2017/0034263 A1 | 2/2017 | Archambault et al. |
| 2017/0093943 A1 | 3/2017 | Alsina |
| 2017/0251040 A1 | 8/2017 | Archambault et al. |
| 2017/0289202 A1 | 10/2017 | Krasadakis |
| 2018/0139155 A1 | 5/2018 | Kurisu et al. |
| 2019/0018644 A1 | 1/2019 | Kovacevic et al. |
| 2019/0050483 A1 | 2/2019 | O'Driscoll et al. |
| 2019/0243534 A1 | 8/2019 | Vega et al. |
| 2019/0325035 A1 | 10/2019 | Sagui et al. |
| 2020/0082019 A1 | 3/2020 | Allen et al. |

FOREIGN PATENT DOCUMENTS

| | | |
|---|---|---|
| EP | 3554091 A1 | 10/2019 |
| WO | WO2016156553 | 10/2016 |
| WO | WO2016156554 | 10/2016 |
| WO | WO2016156555 | 10/2016 |

OTHER PUBLICATIONS

Nelson Granados, Flo: Finally, an app that lets partygoers mix the playlist on the fly, May 27, 2016, https://www.forbes.com/sites/nelsongranados/2016/05/27/flo-finally-an-app-to-crowdsource-live-the-partys-playlist/#41e8d2a45c41, 4 pgs.

Newswatch, Party Play—A collaborative playlist from all your party guests, Oct. 20, 2017, https://newswatchtv.com/2017/10/20/party-play-newswatch-review/ , 2 pgs.

Buskirk, AudioVroom changes the social radio game, http://evolver.fm/2011/03/23/audiovroom-changes-the-social-radio-game/, Mar. 23, 2011, 5 pgs.

O'Driscoll, Office Action, U.S. Appl. No. 15/087,448, dated Aug. 1, 2016, 20 pgs.

O'Driscoll, Final Office Action, U.S. Appl. No. 15/087,448, dated Jan. 19, 2017, 24 pgs.

O'Driscoll, Office Action, U.S. Appl. No. 15/087,448, dated Aug. 3, 2017, 37 pgs.

O'Driscoll, Final Office Action, U.S. Appl. No. 15/087,448, dated Mar. 12, 2018, 39 pgs.

O'Driscoll, Office Action, U.S. Appl. No. 15/087,448, dated Aug. 15, 2018, 33 pgs.

O'Driscoll, Final Office Action, U.S. Appl. No. 15/087,448, dated Mar. 27, 2019, 42 pgs.

O'Driscoll, Office Action, U.S. Appl. No. 15/087,448, dated Nov. 21, 2019, 45 pgs.

O'Driscoll, Final Office Action, U.S. Appl. No. 15/087,448, dated Jul. 13, 2020, 45 pgs.

Pauws, et al., "Fast Generation of Optimal Music Playlists using Local Search", Philips Research Europe, 2006, 6 pages.

Stojmenovic, et al., "Bluetooth scatternet formation in ad hoc wireless networks", University of Ottawa, Jan. 2006, 28 pages.

Sutterer, et al., "UPOS: User Profile Ontology with Situation-Dependent Preferences Support", First International Conference on Advances in Computer-Human Interaction, Mar. 2008, pp. 230-235, 6 pages.

Wang, et al., "Context-Aware Mobile Music Recommendation for Daily Activities", School of Computing, National University of Singapore, MM'12, Oct. 29-Nov. 2, 2012, pp. 99-108, 10 pages.

Xiao, et al., "Learning a Music Similarity Measure on Automatic Annotations with Application to Playlist Generation", CASSP 2009, pp. 1885-1888, 4 pages.

Written Opinion of the International Preliminary Examining Authority dated Jun. 10, 2016 for PCT International Patent Application No. PCT/EP2016/057177, 8 pages.

International Search Report and Written Opinion of the International Searching Authority dated Jul. 11, 2016 for PCT International Patent Application No. PCT/EP2016/057175, 12 pages.

United States Patent and Trademark Office, Office Action dated Sep. 22, 2016 for U.S. Appl. No. 15/087,455, 10 pages.

United States Patent and Trademark Office, Office Action dated Sep. 26, 2016 for U.S. Appl. No. 15/087,428, 9 pages.

United States Patent and Trademark Office, Final Office Action dated Mar. 8, 2017 for U.S. Appl. No. 15/087,455, 11 pages.

United States Patent and Trademark Office, Office Action dated Mar. 29, 2017 for U.S. Appl. No. 15/087,428, 14 pages.

International Preliminary Report on Patentability dated May 31, 2017 for PCT International Patent Application No. PCT/EP2016/057176, 11 pages.

United States Patent and Trademark Office, Office Action dated Oct. 26, 2017 for U.S. Appl. No. 15/087,455, 13 pages.

United States Patent and Trademark Office, Office Action dated Jan. 5, 2018 for U.S. Appl. No. 15/087,428, 16 pages.

Communication pursuant to Article 94(3) EPC dated Apr. 24, 2018 for EP Application No. 16712927.9, 5 pages.

Communication pursuant to Article 94(3) EPC dated Apr. 24, 2018 for EP Application No. 16712928.7, 6 pages.

United States Patent and Trademark Office, Notice of Allowance dated Jun. 14, 2018 for U.S. Appl. No. 15/087,455, 27 pages.

United States Patent and Trademark Office, Office Action dated Aug. 2, 2018 for U.S. Appl. No. 15/087,428, 16 pages.

Summons to attend oral proceedings pursuant to Rule 115(1) EPC mailed Oct. 10, 2018 for EP Application No. 16712927.9, 7 pages.

(56) References Cited

OTHER PUBLICATIONS

Result of consultation by telephone from the applicant mailed Feb. 8, 2019 for EP Application No. 16712927.9, 4 ages.
Communication pursuant to Article 94(3) EPC dated May 10, 2019 for EP Application No. 16712928.7, 8 pages.
United States Patent and Trademark Office, Office Action dated Jun. 20, 2019 for U.S. Appl. No. 15/087,428, 15 pages.
Decision to grant a European patent pursuant to Article 97(1) EPC dated Jul. 11, 2019 for EP Application No. 16712927.9, 2 pages.
Extended European Search Report dated Jul. 11, 2019 for EP Application No. 19172512.6, 10 pages.
United States Patent and Trademark Office, Office Action dated Feb. 13, 2020 for U.S. Appl. No. 15/087,428, 17 pages.
Elliott et al., Personal Soundtrack: Context-aware playlists that adapt to user pace, Proceedings of ACM CHI 2006, Apr. 22-28, 2006, Montreal, Quebec, Canada, pp. 736-741 (Year: 2006).
Broberg, Office Action, U.S. Appl. No. 16/868,404, dated Mar. 18, 2021, 9 pgs.
Hernejarvi, Office Action, U.S. Appl. No. 16/784,090, dated Jan. 29, 2021, 8 pgs.
O'Driscoll, Office Action, U.S. Appl. No. 16/879,644, dated May 20, 2021, 29 pgs.
Spotify AB, Extended European Search Report, EP21165870,3, dated Jun. 8, 2021, 7 pgs.

\* cited by examiner

| Shared Queue (Presented) 201 | User 1 | User 2 | User 3 |
|---|---|---|---|
| Media Content Item 221 | .32 | .01 | .98 |
| Media Content Item 222 | .12 | .91 | .87 |
| Media Content Item 223 | .99 | .11 | .20 |
| Media Content Item 224 | .76 | .66 | .89 |
| Media Content Item 225 | .28 | .49 | .71 |
| Cumulative score 204 | 2.47 | 2.18 | 3.65 |

| Shared Queue (Up Next) 202 | User 1 | User 2 | User 3 |
|---|---|---|---|
| Media Content Item 231 | .94 | .41 | .07 |
| Media Content Item 232 | .14 | .58 | .88 |
| Media Content Item 233 | .11 | .84 | .42 |

302 — At an electronic device associated with a media-providing service and having one or more processors and memory storing instructions for execution by the one or more processors:

304 — Store, for each respective user of a plurality of users participating in a shared playback session, a profile for the respective user that includes an indication of musical preferences of the respective user.

306 — Store a shared playback queue for the shared playback session, the shared playback queue comprising one or more media content items, including a first media content item requested by a first user of the plurality of users.

308 — Each media content item in the shared playback queue is associated with a respective user.

310 — While the shared playback queue includes the first media content item, receive a second request, from a second user of the plurality of users, to add a second media content item to the shared playback queue.

312 — Determine an order of the shared playback queue based at least in part on the musical preferences indicated in the profile of a third user of the plurality of users participating in the shared playback session. The third user is distinct from the first user and the second user.

314 — The order of the shared playback queue is determined based on a comparison of a cumulative dissatisfaction for first media content item among the plurality of users and a cumulative dissatisfaction for second media content item among the plurality of users.

316 — The order of the shared playback queue is determined based on a dissatisfaction of a most-dissatisfied user of the plurality of users.

Determine an order of the shared playback queue based at least in part on the musical preferences indicating in the profile of a third user of the plurality of users participating in the shared playback session. The third user is distinct from the first user and the second user. ⟵ 312

(A)

- - - - - - - - - - - - - - - - - - - - - - - - - - - - - - - - - -
| The order of the shared playback queue is determined based on a comparison of a cumulative satisfaction for first media content item among the plurality of users and a cumulative satisfaction for second media content item among the plurality of users. | ⟵ 318

- - - - - - - - - - - - - - - - - - - - - - - - - - - - - - - - - -
| For each respective user of a plurality of users participating in the shared playback session, the indication of the musical preferences of the respective user comprises a respective vector in a vector space. | ⟵ 320

The first media content item is represented by a first vector in the vector space.

The second media content item is represented by a second vector in the vector space.

Determining the order of the shared playback queue comprises comparing the first vector and the second vector to the respective vector representing the third user.

- - - - - - - - - - - - - - - - - - - - - - - - - - - - - - - -
| Determining the order of the shared playback queue comprises:

determining a cumulative score for each user, the cumulative score reflecting a sum of respective vector distances calculated between respective media content items presented in the shared playback queue and the respective user; | ⟵ 322 comparing the respective cumulative scores for each respective user to identify a user with the largest cumulative score; and ordering the shared playback queue so as to present a media content item requested by the identified user as the next media content item to be played.

- - - - - - - - - - - - - - - - - - - - - - - - -
| The vector distance represents a satisfaction of the user for the respective media content item. | ⟵ 324

312
Determine an order of the shared playback queue based at least in part on the musical preferences indicating in the profile of a third user of the plurality of users participating in the shared playback session. The third user is distinct from the first user and the second user.

320
For each respective user of a plurality of users participating in the shared playback session, the indication of the musical preferences of the respective user comprises a respective vector in a vector space.

The first media content item is represented by a first vector in the vector space.

The second media content item is represented by a second vector in the vector space.

Determining the order of the shared playback queue comprises comparing the first vector and the second vector to the respective vector representing the third user.

(B)

326
The vector representing a respective media content item is based on one or more of: a degree to which a media content item is acoustic, a strength of a beat, a degree to which a media content item sounds choppy, suitability for dancing, positions of a media content item where downbeats occur, duration of a media content item, average dynamic range, a measure of energy of a media content item, a degree to which the twelve pitches are balanced, a degree to which a media content item contains vocals, key, a degree to which a live audience is present, loudness, a degree of consistency of timing, fade-in point, fade-out point, modal scale, suitability for running, a degree to which a media content item includes spoken words, tempo, time signature, and a degree to which a media content item is cheerful.

328
The vector for each user is based on a playback history of the user.

330
The vector for each user represents an average taste of the user for media content.

332
Provide, for playback in the shared playback session, the first media content item and the second media content item based on the order of the shared playback queue.

FIGURE 3C

METHODS AND SYSTEMS FOR INTERACTIVE QUEUING FOR SHARED LISTENING SESSIONS BASED ON USER SATISFACTION

RELATED APPLICATIONS

This application is related to U.S. patent application Ser. No. 16/903,078, entitled "Methods and Systems for Interactive Queuing for Shared Listening Sessions," filed Jun. 16, 2020.

TECHNICAL FIELD

The disclosed embodiments relate generally to media playback, and, in particular, providing shared media playback sessions.

BACKGROUND

Access to electronic media, such as music and video content, has expanded dramatically over time. As a departure from physical media, media content providers stream media to electronic devices across wireless networks, improving the convenience with which users can digest and experience such content.

SUMMARY

Some embodiments of the present disclosure provide shared listening sessions (also referred to as "shared playback sessions" throughout). In a shared listening session, a plurality of users can add media content to be played back to a group (either on a single presentation device, e.g., at a party, or on each user's individual device at remote locations). For example, each user participating in the shared listening session is able contribute to and control a collection of media content (e.g., a collectively-generated queue), which is played back simultaneously to each of the users in the group (either using a presentation system common to the group, such as a speaker in a room with all of the users, or separately, using the user's individual devices). In this way, each of a plurality of users may access, contribute to, and control playback of a shared queue.

A user participating in a shared listening session may feel that other users are "hogging the jukebox," e.g., by adding more than their fair share of content items to the queue. Accordingly, there is a need for systems and methods for queuing (ordering) media content items requested by different users fairly, so that individual users do not monopolize the content.

To address this problem, a method is provided for ordering the content in the shared listening session based on user satisfaction within the group (e.g., so as to reduce the dissatisfaction of the least satisfied user). For example, the satisfaction of each of the users is determined by measuring a vector distance between a media content item and a vector that represents a user. Each media content item is represented by a vector, for example, based on its genre, tempo, mood, etc. The vector that represents the user is based on the musical tastes of the user determined from a playback history of the user (e.g., a normalized sum of vectors representing media content items in the user's listening history). The longest distance between a user's vector and the vector of a musical item indicates the user is least satisfied (e.g., least likely to enjoy that particular musical item). Using these vectors, the electronic device ranks the content in a shared listening queue based on user satisfaction (e.g., to maximize the satisfaction of the least satisfied users, maximize the cumulative satisfaction of all of the users, etc.).

In accordance with some embodiments, a method is performed at an electronic device (e.g., associated with a media content provider) having one or more processors and memory storing instructions for execution by the one or more processors. The method includes storing, for each respective user of a plurality of users participating in a shared playback session, a profile for the respective user that includes an indication of musical preferences of the respective user. The method includes storing a shared playback queue for the shared playback session, the shared playback queue comprising one or more media content items, including a first media content item requested by a first user of the plurality of users. The method includes, while the shared playback queue includes the first media content item, receiving a second request, from a second user of the plurality of users, to add a second media content item to the shared playback queue. The method includes determining an order of the shared playback queue based at least in part on the musical preferences indicated in the profile of a third user of the plurality of users participating in the shared playback session, wherein the third user is distinct from the first user and the second user. The method further includes providing, for playback in the shared playback session, the first media content item and the second media content item based on the order of the shared playback queue.

In accordance with some embodiments, an electronic device (e.g., a server system, a client device, etc.) includes one or more processors and memory storing one or more programs configured to be executed by the one or more processors. The one or more programs include instructions for performing the operations of the method described above. In accordance with some embodiments, a computer-readable storage medium has stored therein instructions that, when executed by an electronic device, cause the server system to perform the operations of the method described above.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings and specification.

FIGS. 2A-2B illustrate queues for a shared listening session in accordance with some embodiments.

FIGS. 3A-3C are flow diagrams illustrating methods for providing a shared playback session in accordance with some embodiments.

DETAILED DESCRIPTION

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first client device could be termed a second client device, and, similarly, a second client device could be termed a first client device, without departing from the scope of the various described embodiments. The first client device and the second client device are both client devices, but they are not the same client device.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Figure 1:
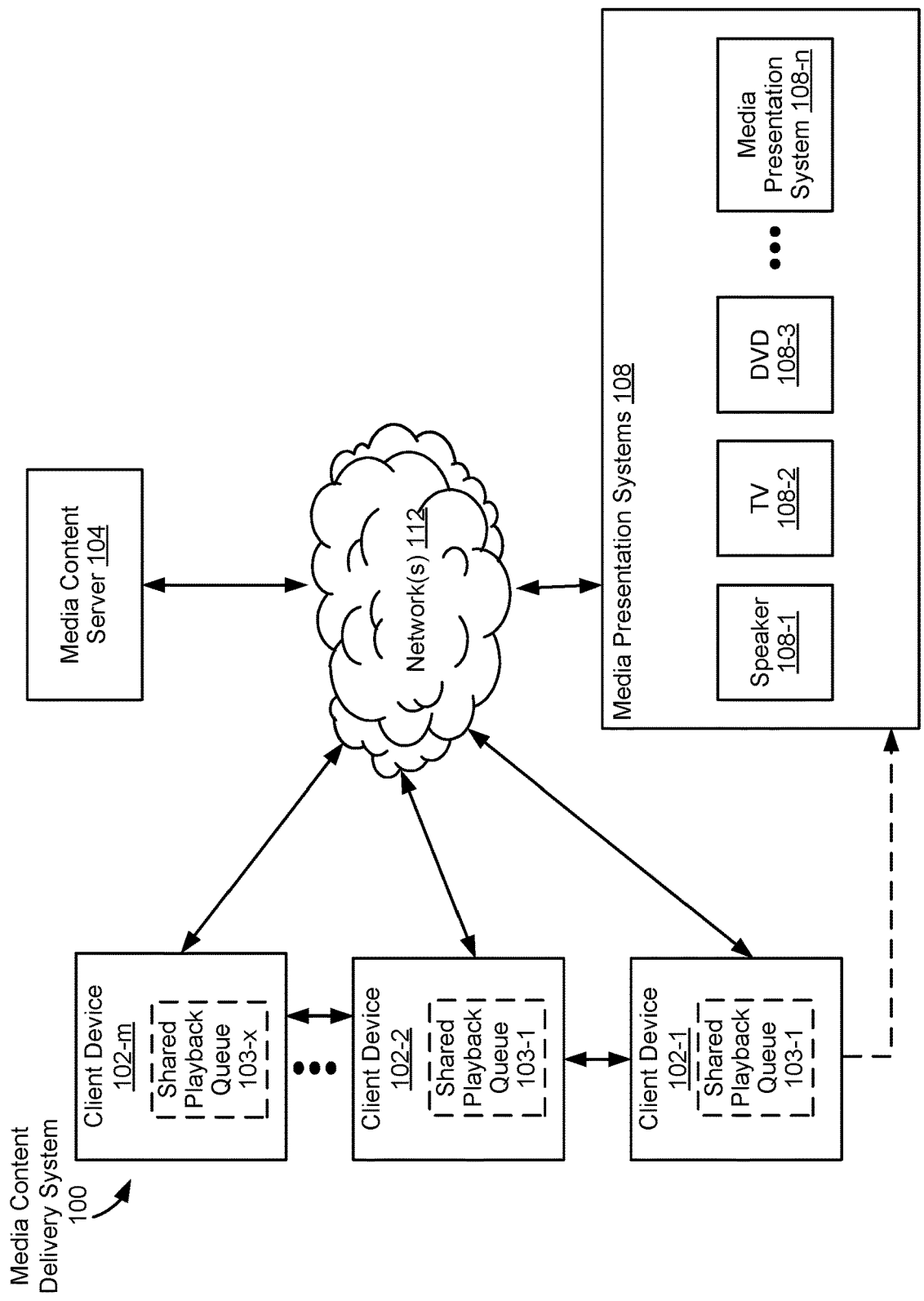
FIG. 1 is a block diagram illustrating a media content delivery system in accordance with some embodiments.

FIG. 1 is a block diagram illustrating a media content delivery system 100 in accordance with some embodiments. The media content delivery system 100 includes one or more client devices 102 (e.g., client device 102-1 to client device 102-*m*, where m is an integer greater than one), one or more media content servers 104, and one or more media presentation systems 108, including speaker 108-1, television (TV) 108-2, digital versatile disk (DVD) player 108-3, and/or other media presentation system 108-*n* (where n is an integer greater than three). The one or more media content servers 104 are associated with (e.g., at least partially compose) a media-providing service. One or more networks 112 communicably couple the components of the media content delivery system 100. In some embodiments, the one or more networks 112 include public communication networks, private communication networks, or a combination of both public and private communication networks. For example, the one or more networks 112 can be any network (or combination of networks) such as the Internet, other wide area networks (WAN), local area networks (LAN), virtual private networks (VPN), metropolitan area networks (MAN), peer-to-peer networks, and/or ad-hoc connections.

In some embodiments, a client device 102-1, 102-2, or 102-*m* is associated with one or more users. In some embodiments, a client device 102 is a personal computer, mobile electronic device, wearable computing device, laptop computer, tablet computer, mobile phone, feature phone, smart phone, digital media player, or any other electronic device capable of presenting media content (e.g., audio and/or video). A client device 102 connects to a media presentation system 108 wirelessly or through a wired connection (e.g., directly through an interface, such as an HDMI interface). In some embodiments, a client device 102 is a headless client. In some embodiments, client devices 102-1 and 102-*m* are the same type of device (e.g., client device 102-1 and client device 102-*m* are both mobile devices). Alternatively, client device 102-1 and client device 102-*m* are different types of devices.

In some embodiments, client devices 102-1, 102-2, and 102-*m* send and receive media-control information through the networks 112. For example, client devices 102-1, 102-2, and 102-*m* send media control requests (e.g., requests to play music, movies, videos, or other media items, or playlists thereof) to media content server 104 through network(s) 112. In some embodiments, client devices 102-1, 102-2, and 102-*m*, receive authentication tokens from the media content server 104 through network(s) 112.

In some embodiments, client device 102-1 communicates directly (e.g., through a wired and/or wireless connection) with client devices 102-2 and/or 102-*m*. For example, in some embodiments client devices 102 directly communicate playback commands and/or audio code signals between each other (e.g., the media content server 104 may or may not be involved in the exchange). In some embodiments, client device 102-2 communicates directly with client device 102-*m*. In some embodiments, client device 102-1 communicates directly with media presentation systems 108. As pictured in FIG. 1, client device 102-1 is able to communicate directly (e.g., through a wired and/or wireless connection) with media presentation systems 108, while client device 102-*m* communicates with the media presentation systems 108 through network(s) 112. In some embodiments, client device 102-1 uses the direct connection with media presentation systems 108 to stream content (e.g., data for media items) for playback on the media presentation systems 108.

In some embodiments, client device 102-1, client device 102-2 and client device 102-*m* each include a media application 422 (FIG. 4) that allows a user of the client device to browse, request (e.g., for playback at the client device 102 and/or a media presentation system 108), and/or present media content (e.g., control playback of music tracks, videos, etc.). Media content may be stored locally (e.g., in memory 412 of the client device 102, FIG. 4) and/or received in a data stream (e.g., from the media content server 104). The media presentation system 108 may be part of the client device 102, such as built-in speakers and/or a display, or may be separate from the client device 102, such as a wirelessly coupled speaker (e.g., speaker 108-1).

In some embodiments, client device 102-1 and client device 102-2 each include an instance of shared playback queue 103-1 (e.g., within media application 422). In some embodiments, shared playback queue 103-1 includes a set (e.g., an ordered list, such as a playlist) of media content items provided by the media content server 104. For example, the media content server 104 establishes a shared playback session (e.g., for two or more client devices of two or more users), stores a shared playback queue corresponding to the shared playback session, and/or provides the shared playback queue to the two or more client devices (e.g., client device 102-1 and client device 102-2). In some embodiments, the two or more client devices 120 are enabled to view and/or edit (e.g., add, remove, and/or reorder) content in the shared playback queue. For example, client device 102-1 and client device 102-2 are each provided with at least a portion of the same shared playback queue 103-1. In some embodiments, the shared playback queue 103-1 includes media content items selected by any combination of client device 102-1, client device 102-2, any other client device(s) 102, presentation systems 108, and/or the media content server 104. In some embodiments, the media content items from the shared playback queue are streamed to (e.g., played at and/or provided to) one or more of media presentation systems 108. For example, each client device 102-1 and client device 102-2 accesses (e.g., views, edits (adds and/or removes media content items from), and/or controls presentation of) the shared playback queue 103-1 while the shared playback queue is presented at one or more of media presentation systems 108. Co-located users are enabled to access the shared playback queue 103-1 on individual devices while streaming media content through media presentation system 108. In some embodiments, the media content items from the shared playback queue are streamed to each of the client devices 102-1 and 102-2 (e.g., instead of or in addition to media presentation system 108). It is to be understood that the shared playback queue 103-1 is enabled to be shared on additional client devices 102 in addition to client device 102-1 and client device 102-2. In some embodiments, a shared playback queue 103-x (distinct from shared playback queue 103-1) is shared between a plurality of client devices 102 (including client device 102-m). For example, the media content server 104 provides a plurality of shared playback queues 103-1 through 103-x, where the shared playback queue 103-1 is provided to a first subset of client devices 102 (e.g., client devices 102-1 and 102-2) and the shared playback queue 103-x is provided to a second subset of client devices 102 (e.g., including client device 102-m) (e.g., distinct from the first subset).

In some embodiments, the media content server 104 stores and provides media content (also referred to as media items) (e.g., media content requested by the media application 422 of client device 102-1, 102-2, and/or 102-m, and/or the shared playback queue 103-1) to client devices 102 and/or media presentation systems 108 via the network(s) 112. Content stored and served by the media content server 104, in some embodiments, includes any appropriate content, including audio (e.g., music, spoken word, podcasts, etc.), videos (e.g., short-form videos, music videos, television shows, movies, clips, previews, etc.), text (e.g., articles, blog posts, emails, etc.), images (e.g., photographs, drawings, renderings, etc.), games (e.g., 2- or 3-dimensional graphics-based computer games, etc.), or any combination of content types (e.g., web pages that include any combination of the foregoing types of content or other content not explicitly listed). Audio media items (i.e., audio items) may be referred to as tracks. The description of the media content server 104 as a "server" is intended as a functional description of the devices, systems, processor cores, and/or other components that provide the functionality attributed to the media content server 104. It will be understood that the media content server 104 may be a single server computer, or may be multiple server computers. Moreover, the media content server 104 may be coupled to other servers and/or server systems, or other devices, such as other client devices, databases, content delivery networks (e.g., peer-to-peer networks), network caches, and the like. In some embodiments, the media content server 104 is implemented by multiple computing devices working together to perform the actions of a server system (e.g., cloud computing).

As described above, media presentation systems 108 (e.g., speaker 108-1, TV 108-2, DVD 108-3, media presentation system 108-n) are capable of receiving media content (e.g., from the media content server 104) and presenting the received media content. For example, speaker 108-1 may be a component of a network-connected audio/video system (e.g., a home entertainment system, a radio/alarm clock with a digital display, or an infotainment system of a vehicle). In some embodiments, the media content server 104 sends media content to the media presentation systems 108. For example, media presentation systems 108 include computers, dedicated media players, network-connected stereo and/or speaker systems, network-connected vehicle media systems, network-connected televisions, network-connected DVD players, and universal serial bus (USB) devices used to provide a playback device with network connectivity, and the like.

In some embodiments, a first user joins (e.g., initiates) a shared playback session with one or more other uses, including a second user. In some embodiments, the electronic device (e.g., server 104) initiates the shared playback session by generating a shared playback queue (e.g., shared playback queue 202 or shared playback queue 103-1). For example, the shared playback queue 202 (e.g., up next shared queue) is a queue that combines requests from the users that participate in the shared playback session. For example, the shared queue includes media content items requested from user 1 (e.g., the first user), media content items requested from user 2 (e.g., the second user), and media content items requested from user 3 (e.g., the third user), where user 1, user 2 and user 3 participate in the shared playback session. In some embodiments, the requests from each respective user are added to a respective user queue for that user, as described below with reference to FIG. 2B.

In some embodiments, media content items that are included in the shared playback queue 202 are played back (e.g., streamed) to each user that is participating in the shared playback session (e.g., to the first user, the second user and the third user). For example, each user is associated with an electronic device for playing back media content (e.g., client devices 102, FIG. 1). In some embodiments, the electronic devices each receive (e.g., stream) the media content item from the shared playback queue at substantially the same time. In some embodiments, the users are co-located and one or more electronic devices are indicated as the playback devices for the shared playback session. For example, a single media presentation system (e.g., media presentation system 108) is designated (e.g., by selection from a user) to play the media content of the shared queue, while the electronic devices (e.g., client devices 102) associated with the users are used, by a respective user, to request media content items to be added to the shared playback queue.

FIG. 2A illustrates a shared playback queue in accordance with some embodiments. It will be understood that the playback queue illustrated in FIG. 2A represents a data structure (e.g., stored at an electronic device). In some embodiments, the shared queue is a single queue (e.g., single data structure, such as a table) that is divided into portions: a first portion corresponding to presented shared queue 201 and a second portion corresponding to up next shared queue 202. In some embodiments, the shared queue comprises two distinct queues. For example, presented shared queue 201 and up next shared queue 202 are distinct queues (e.g., stored as distinct data structures).

In some embodiments, presented shared queue 201 includes media content items that have been previously presented (e.g., played back) in a shared playback session. For example, once a media content item begins (e.g., or completes) playback, the media content item is added to the presented shared queue 201 (e.g., and removed from up next shared queue 202).

In some embodiments, up next shared queue 202 includes media content items that have not yet been presented (e.g., media content items that are to be played back during the shared listening session in the future). For example, in response to a user request to add a media content item to be included in a shared playback session, the requested media content item is added to the up next shared queue 202.

In some embodiments, a server system (e.g., media content server 104) stores the shared queue(s). In some embodiments, a copy of the shared queue is stored at each of the client devices 102 associated with users that are participating in the shared playback session for the shared queue. In some embodiments, the shared queue(s) are stored at one client device (e.g., a host device) that is participating in the shared playback session.

In some embodiments, a media content item is removed from one or more queues (e.g., moved from the up next shared queue to the presented shared queue) in accordance with a determination that the media content item has been presented. For example, media content item 221 was played back in the shared playback session (e.g., by streaming to the one or more client devices and/or presentation devices). In some embodiments, the media content item is removed as soon as playback is initiated (e.g., whether or not the media content item is played all the way through). In some embodiments, the media content item is removed after completing playback of the media content item. In some embodiments, the media content item is removed in accordance with a determination that a user "skips" the media content item (e.g., stops playback of the media content item).

In some embodiments, each user that participates in a shared listening session has a corresponding user profile (e.g., a user taste profile). For example, the server system stores information about each user, including profile of demographic information of a user and/or a playback history of the user (e.g., stored in playback history module 526). In some embodiments, the server system determines features of the respective user based on the playback history of the user and/or information from the user profile. In some embodiments, the server system defines the respective user as a vector in vector space. For example, the user's taste (e.g., based on the user's playback history) is represented by the vector. In some embodiments, the vector is stored in the user's profile.

In some embodiments, each media content item is also represented as a vector in the same vector space. For example, features (e.g., or tags) of a media content item are used to calculate its representative vector. For example, the vector of a media content item represents a combination of one or more of a genre of the media content item, a degree to which a media content item is acoustic, a strength of a beat, a degree to which a media content item sounds choppy, suitability for dancing, positions of a media content item where downbeats occur, duration of a media content item, average dynamic range, a measure of energy of a media content item, a degree to which the twelve pitches are balanced, a degree to which a media content item contains vocals, key, a degree to which a live audience is present, loudness, a degree of consistency of timing, fade-in point, fade-out point, modal scale, suitability for running, a degree to which a media content item includes spoken words, tempo, time signature, and a degree to which a media content item is cheerful. In some embodiments, media content items are tagged (e.g., described) using particular features that are represented in the vector space.

In some embodiments, a user's profile vector is compared with (e.g., by calculating a vector distance to) respective vectors of respective media content items. In some embodiments, the user's profile vector is compared with media items from the shared playback session that have already been played (e.g., the media items from presented shared queue 201, in order to determine how dissatisfied the user is likely to be with content that has already been presented). In some embodiments, the user's profile vector is compared with one or more media items from the shared playback queue that have yet to be presented (e.g., one or more media items from up next shared queue 202, so as to reduce future dissatisfaction). The comparison determines a similarity between the user's taste and the features of the one or more media content items to which the vectors are compared. For simplicity, the description below refers to a comparison of the user's taste to a respective media content item. For example, a smallest vector distance between the user's profile vector and the vector representing the media content item corresponds to a user having the most similar taste to the media content item (e.g., a favorite media content item). In contrast, a largest vector distance between the user's profile vector and a vector representing a second media content item corresponds to the user's taste not aligning (e.g., dissimilar) to the second media content item. Thus, a user is less likely to enjoy a media content item that is represented by a content vector with a large vector distance relative to the user's taste vector.

In some embodiments, the electronic device calculates vector distances between the media content item and a respective user's taste vector for each user that is participating in a shared playback session. For example, as illustrated in FIG. 2A, for each media content item in the shared queues 201 and 202, each user (e.g., user 1, user 2, and user 3) is assigned a score. In some embodiments, the score represents the vector distance (e.g., or a normalized vector distance) between the respective user and the respective media content item. For example, user 1 is assigned a score of 0.32 for media content item 221, user 2 is assigned a score of 0.01 for media content item 221, and user 3 is assigned a score of 0.98 for media content item 221. This represents that user 2 is the most satisfied with the media content item 221 because user 2 has the shortest vector distance (e.g., lowest score). Thus, the taste profile vector of user 2 was close in the vector space to media content item 221. In contrast, user 3 is assigned a score of 0.98, which indicates that user 3 is the least satisfied of the users with media content item 221 (e.g., the taste profile vector of user 3 was the farthest in vector space from the vector representing media content item 221, as compared to the other users of the shared playback session). Note that, although the example above describes the user of vector distances as the score, in some embodiments, the vector distances are converted to a score between 0 and 1, or −1 and 1, where higher scores indicate higher (e.g., or lower) satisfaction.

In some embodiments, a score is calculated for each media content item that has been presented (e.g., the media content items in presented share queue 201). For example, each user is assigned a score for media content item 221, media content item 222, media content item 223, media content item 224, and media content item 225. In some embodiments, a cumulative score 204 is calculated to represent the scores of all of the media content items that have been presented. For example, for each user, a cumulative score is calculated by adding the scores for the user of each of the media content items that have been presented (or will be presented). It will be understood by one of ordinary skill in the art, having the benefit of this disclosure, that a score is assigned to a respective user, for each media content item, based on a measure of the user's predicted satisfaction of the media content item. Calculating a vector distance between the user's taste profile vector and a vector representing features of the media content item is one example of predicting a user's satisfaction. Other methods of representing the user's satisfaction (e.g., a number of times a user has consumed the media content item) may also be used (e.g., in addition to or instead of calculating a vector distance).

In some embodiments, the electronic device determines a least satisfied user based on the cumulative score 204. For example, the least satisfied user corresponds to the greatest cumulative score (e.g., with the greatest overall vector distance). For example, user 3 has the largest cumulative score of 3.65, indicating that user 3 is the least satisfied (e.g., compared to the other users in the shared playback session) with the presented shared playback queue 201. For example, user 2 is the most satisfied with the presented shared playback queue 201 because user 2 has the lowest cumulative score of 2.18 compared to the other users in the shared playback session.

In some embodiments, the cumulative score is calculated as a weighted combination of vector comparisons to the most recently presented media content item(s) and used to determine the least satisfied user. For example, the device weighs the more recently presented media content item(s) greater than the media content item(s) that were presented previously. For example, the cumulative score weights the scores of media content item 225 greater than the scores of media content item 221. It will be understood that any combination of weights (e.g., based on the order of playback of media content items) may be used to calculate the cumulative score.

In some embodiments, instead of using the cumulative score 204, the electronic device determines a least satisfied user (e.g., based on the scores for the most recently presented media content item). For example, the least satisfied user is determined based on the scores for media content item 225. In this example, user 3 is the least satisfied user with the media content item 225, as indicated by the highest score of 0.71 of user 3, as compared to the score of 0.49 for user 2 and 0.28 for user 1. For example, user 1 is the most satisfied with media content item 225 because user 1 has the lowest score.

In some embodiments, a score is calculated for each media content item that is in the up next shared queue 202. For example, each user is assigned a score for media content item 231, media content item 232, and media content item 233.

In some embodiments, an overall score is calculated for each media content item (e.g., where the overall score is a combination of scores for each user for the respective media content item). For example, each media content item is assigned an overall score indicating an overall satisfaction (e.g., among participating users) with an upcoming media content item. For example, the device determines an order of playback based on the overall score for each media content item (e.g., the media content item with the lowest and/or highest overall score is selected as the next media content item). Thus, the electronic device selects an order of playback of media content items in order to maximize satisfaction of all users (e.g., by generating an overall score for each media content item).

In some embodiments, the device determines an order of playback for the media content items in up next shared queue 202 based at least in part on the calculated score(s) (e.g., or cumulative score(s)). In some embodiments, the scores calculated for the media content items in the up next shared queue 202 are used, by the electronic device, to select which media content item to present next (e.g., determine an order of presentation for the media content items in the up next queue). For example, the electronic device selects a media content item from the up next shared queue 202 by selecting a media content item with the smallest score for the least satisfied user (e.g., as identified by calculating the cumulative score, explained above).

For example, taking the cumulative scores illustrated in FIG. 2A, where the cumulative score for each user represents the summation (e.g., unweighted) of the scores for the user for each media content item played back in the presented shared queue 201, user 3 has the greatest cumulative score of 3.65, indicating that user 3 is the least satisfied user in the shared playback session. Thus, the electronic device selects, from the up next shared queue 202, a media content item that has the minimum score for user 3. For example, the electronic device selects the media content item that most closely matches (e.g., minimizes the vector distance) user 3's taste profile vector. For example, up next shared queue 202 includes media content item 231, media content item 232 and media content 233. The scores assigned to user 3 (e.g., the identified least satisfied user) are 0.07, 0.88 and 0.42, respectively. Therefore, of the media content items in the up next shared queue 202, user 3 was assigned the lowest score for media content item 231 (e.g., the vector distance between media content item 231 and the taste profile vector of user 3 is the smallest, compared to the respective vector distances between the other media content items and the taste profile vector of user 3). Thus, the electronic device selects media content item 231 to be presented next in the shared playback session.

After media content item 231 is played back in the shared playback session, media content item 231 is moved to presented shared queue 201, and the cumulative score 204 for each of the users is updated to include the scores assigned for media content item 231. For example, the updated cumulative scores 204 would be: 3.41 for user 1, 2.59 for user 2, and 3.72 for user 3. Therefore, user 3 would again be identified as the least satisfied user (e.g., the user with the greatest cumulative score). The device would then select a media content item from up next shared queue 202 that has the smallest score for user 3 (e.g., media content item 233) to be presented as a next media content item.

In some embodiments, the electronic device calculates the cumulative scores before playing back the media content item(s) (e.g., based on all of the media content items currently in the up next shared queue) and adjusts the order of the up next shared queue 202 to reflect the order in which the media content items will be presented. For example, the electronic device would order media content item 233 in the queue above media content item 232 because the device has determined that media content item 233 will be played before media content item 232.

In this way, the user that is identified to be the least satisfied with the previously presented media content items (e.g., media content items 221-225), will be presented (e.g., via the shared playback session) with a media content item that most closely matches the user's taste profile (e.g., playback history). This automatic ordering of media content items to present in the shared playback session prevents any single user in the session from becoming overly dissatisfied, e.g., because another user has monopolized the content. In the example of FIG. 2A, the user who requests the media content items (e.g., to be added to up next shared queue 202) is not dispositive of the order of the shared playback queue. For example, media content item 231 is added (e.g., requested) by user 2, but the taste profile vector of user 3 is closer to the vector representing media content item 231 than the taste profile vector of user 2 is to the vector representing media content item 231. Thus, in some embodiments, the score assigned to each user for a given media content item does not indicate which use selected the media content item.

In some embodiments, the user that adds the media content item is automatically assigned a score of 0 for that media content item. For example, instead of calculating a vector distance for the user who requests the media content item, that user is automatically assigned a score of 0.

Figure 2B:
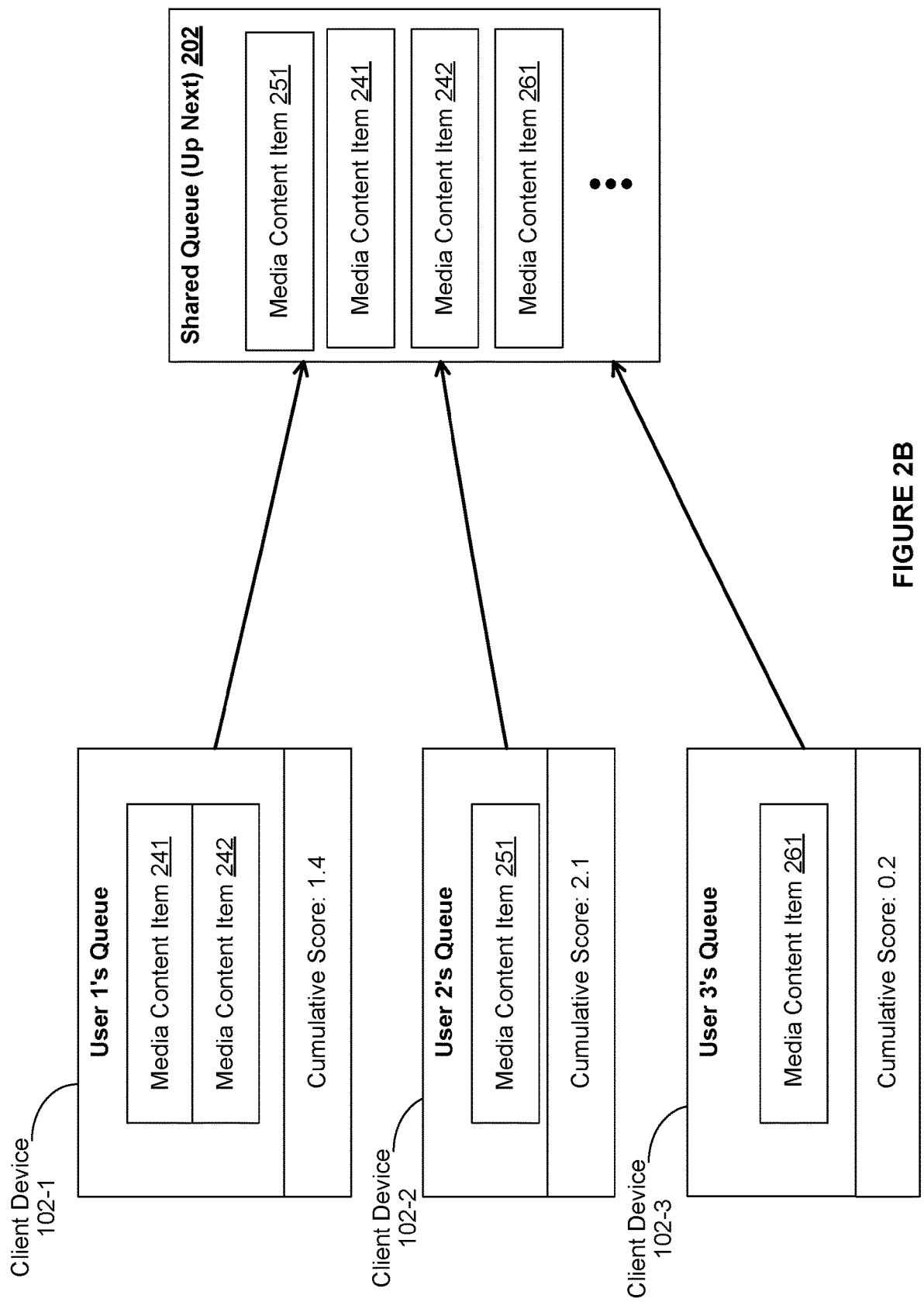

FIG. 2B illustrates a plurality of queues for a shared playback session. FIG. 2B illustrates separate queues for each user participating in the shared listening session (e.g., "User 1's Queue" "User 2's Queue" and "User 3's Queue"). In some embodiments, user 1's queue is stored at a first client device 102-1 (e.g., associated with user 1). In some embodiments, an electronic device stores all of the queues (e.g., the user queues and the shared queue). For example, the server system (e.g., media content server 104) stores all of the queues. In some embodiments, the respective client device of the respective user stores the user's queue and the shared queue (e.g., a copy of the shared queue). For example, client device 102-1 stores user 1's queue and shared queue 202 (e.g., or shared playback queue 103-1, as illustrated in FIG. 1), and client device 102-2 stores user 2's queue and the shared queue 214 (e.g., or shared playback queue 103-1). It will be understood that the queues can be stored at a single device, divided among a plurality of devices, or the queues (e.g., or some combination of the queues) are stored at each device.

In some embodiments, the electronic device determines which user in the shared playback session is least satisfied. For example, as described with reference to FIG. 2A, the electronic device calculates, for each user, a cumulative score representing the satisfaction of the user of the previously presented media content items in the shared playback session (e.g., media content items 221-225 in presented shared queue 201). While the presented shared queue 201 is not illustrated in FIG. 2B, it will be understood that in some embodiments, the device stores the presented media content items in the shared playback queue after they have been presented. The presented media content items are used to calculate the cumulative scores for each user.

In some embodiments, the device changes an order of the shared listening session such that the least satisfied user selects the next content item to be played. For example, user 1 has a cumulative score of 1.4, user 2 has a cumulative score of 2.1, and user 3 has a cumulative score of 0.2. In some embodiments, a greatest cumulative score corresponds to the user that is least satisfied. For example, as explained above, the cumulative score represents a summation of vector distances between the respective vector of the user's taste profile and the respective vector representing the media content item.

In some embodiments, the electronic device makes a determination based on the current media item only. For example, the user that most greatly dislikes the currently playing item the most (e.g., as determined by the largest score) is identified, and the device selects the next media content item from the identified user's queue. In some embodiments, the electronic device makes the determination on the least satisfied user based on all of the media items that have been played during the shared listening session (e.g., cumulative score). For example, as explained with reference to FIG. 2A, for each user in the shared listening session, a cumulative score is kept representing the vector distance between that user and each content item that has been presented. For example, by adding the distances together to create a score. The user with the highest score out of the group (e.g., indicating the largest sum of vector distances) is determined as the user to select the next playback item.

FIG. 2B further illustrates that in response to a user selecting a media content item (e.g., from a collection of media content items provided by a media content provider (e.g., stored at media content server 104 and/or stored locally at client device 102)), the media content item is placed in the user's queue. In some embodiments, the first user selects (e.g., at client device 102-1) the media content item 241. In some embodiments, media content item 241 is selected from a playlist, an album, or a search result presented to the user in media application 422 (e.g., using media content browsing module 426, FIG. 4). In some embodiments, in response to the first user adding media content item 241 to user 1's queue, the shared queue 202 is also updated in include media content item 241. In some embodiments, shared queue 202 includes all of the media content items that are included in the user queues of users participating in the shared listening session. For example, shared queue 202 includes all of the media content items from user 1's queue, user 2's queue, and user 3's queue. In some embodiments, shared queue 202 combines the media content items from participating user queues and selects an order of the media content items in the shared queue (e.g., based on the least satisfied user, as described above).

The description of FIGS. 2A-2B, above, provide various examples in which users' tastes are compared to songs in a shared playback queue, be in already-presented songs, or to-be presented songs. It should be recognized that there are many possible combinations of embodiments, in terms of which media items the users' taste is being compared to and how that comparison is used to order or re-order the remaining queue. Table 1, shown below, summarizes a non-exhaustive list of the alternatives, some of which may be used in combination.

TABLE 1

| How to determine satisfaction | How to order the shared playback queue: |
|---|---|
| Compare users' tastes to media content items that have already been presented in the shared listening session, cumulatively (e.g., media items in presented queue 201). | Determine a least-satisfied user and (i) select, as a next media item, the least-satisfied user's favorite media item from the up next queue and/or (ii) allow the least-satisfied user to select the next media item (e.g., promote the least satisfied user's selection) |

TABLE 1-continued

| How to determine satisfaction | How to order the shared playback queue: |
| --- | --- |
| Compare users' tastes to media content items that are to-be presented, cumulatively (e.g., media items in up-next queue 202). | Determine a least-satisfied user and (i) select, as a next media item, the least-satisfied user's favorite media item from the up next queue and/or (ii) allow the least-satisfied user to pick the next media item (e.g., promote the least satisfied user's selection) |
| Compare users' tastes to media content items that are to-be presented, individually (e.g., media items in up-next queue 202). For example, calculate a satisfaction score for each up-next media item for each user (e.g., determine a maximum dissatisfaction (highest) score for each media item in the up-next queue) | Select, as a next media item, a media item that minimizes the satisfaction score (e.g., minimizes the maximum dissatisfaction) among the media items in the up-next queue. |
| For each media item, determine a cumulative (e.g., overall) satisfaction score across users. | Order media items by cumulative (e.g., overall) satisfaction score across users. |

In some embodiments, a user removes a media content item from the user queue. In response to the user removing a media content item, the shared queue 202 is updated to the remove media content item (e.g., the media content item will not be played back in the shared listening session).

In some embodiments, shared queue 202 includes additional media content items that are not requested by a user participating in the shared playback session. For example, shared queue 202 includes one or more contextual media content items. In some embodiments, contextual media content items comprise media content items that are selected without user input (e.g., automatically by the electronic device hosting the shared queue 202). For example, contextual media content items are identified as similar media content items to one or more media content items that are requested by the users. In some embodiments, contextual media content items includes media content items that appear in a playlist, album, or other grouping that includes a media content item requested by a user. For example, the first user requests media content item 241 to be added to the shared queue 202. In some embodiments, the media content item 241 was selected (e.g., in the media application 422) from a playlist (e.g., a list of media content items). The contextual media content items include additional media content items from the playlist (e.g., other than media content item 241). Thus, the electronic device provides contextual media content items to the shared queue based on the selection of media content item 241 to the user. It will be understood that the order of presentation of the contextual media content items in the shared queue 202 is determined based on the satisfaction of the users, as described above with reference to FIG. 2A.

In this way, the electronic device automatically adds media content items to the shared playback session based on the media content items that have been requested by the users. Users may stop requesting media content items (e.g., adding media content items to shared queue 202), and the shared queue continues playback by automatically selecting contextual media content items. In some embodiments, the electronic device continues selecting (e.g., playing back) contextual media content items until the shared playback session ends. In some embodiments, the contextual media content items change (e.g., are updated) dynamically in accordance with requests from the users. For example, the contextual media content items are updated to include additional media content items that relate to a most recently requested media content item in the shared queue 202. For example, the contextual media content items include one or more media content items that match (e.g., relate to) the last (e.g., most recent) media content item that was selected by a user in the shared playback session.

In some embodiments, a graphical user interface is provided to the user so that the user can view one or more of the shared queues. For example, in some embodiments, a user participating in the shared playback session is enabled to view and/or access all of the shared queues (e.g., the previously presented shared queue and the up next shared queue). In some embodiments, a user participating in the shared playback session is enabled to view only their personal queue. In some embodiments, a user participating in the shared playback session is enabled to view only one of (e.g., a portion of) the shared queue (e.g., only up next shared queue 202).

In some embodiments, each media content item in the shared queue(s) that is displayed in the graphical user interface comprises a link (e.g., a uniform resource locator (URL)). For example, a user is enabled to select (e.g., click) the media content item (e.g., link) and be directed to a user interface that displays information related to the selected media content item. In some embodiments, selection of the link causes the electronic device (e.g., client device 102-1 and/or media presentation system 108) to begin playback of (e.g., preview outside of the shared playback session) the selected media content item in an application of a media content provider. For example, the client device 102-1 of the first user displays user 1's queue on a user interface, including displaying each media content item in user 1's queue as a selectable content item (e.g., as a URL). For example, a user selects a content item to access additional information related to the content item (e.g., an artist, genre, album, or playlist that includes the content item). In some embodiments, a user can edit (e.g., in the user interface displaying user 1's queue) the selectable content item with respect to user 1's queue (e.g., the user can add additional content items to the queue, remove content items from the queue, etc.). For example, the user interface includes affordances that allow the user to modify user 1's queue.

FIGS. 3A-3C are flow diagrams illustrating a method 300 for providing a shared playback session, in accordance with some embodiments. Method 300 may be performed (302) at an electronic device (e.g., media content server 104, FIGS. 1 and 5; client device 102, FIGS. 1 and 4) having one or more processors and memory storing instructions for execution by the one or more processors. In some embodiments, the electronic device is associated with a media-providing service (e.g., provides media content for playback to client devices 102 and/or media presentation systems 108 in a media content delivery system 100, and/or executes an application for the media-providing service). In some embodiments, the method 300 is performed by executing instructions stored in the memory of a server system (e.g., in memory 506, FIG. 5) or client device (e.g., in memory 412, FIG. 4). In some embodiments, the method 300 is performed by a combination of the server system and a client device.

Referring now to FIG. 3A, in performing the method 300, the electronic device stores (304), for each respective user of a plurality of users participating in a shared playback session, a profile for the respective user that includes an indication of musical preferences of the respective user.

In some embodiments, the electronic device stores (306) a shared playback queue for the shared playback session, the shared playback queue comprising one or more media content items, including a first media content item requested by a first user of the plurality of users.

In some embodiments, each media content item in the shared playback queue is associated (308) with a respective user. For example, each media content item that is selected by a user is associated with that user.

While the shared playback queue includes the first media content item, the electronic device receives (310) a second request, from a second user of the plurality of users, to add a second media content item to the shared playback queue. For example, the second request is received while presenting content in the shared playback session. For example, user 2 adds a media content item 251 while the electronic device is presenting a media content item in the shared playback session.

The electronic device determines (312) an order of the shared playback queue based at least in part on the musical preferences indicated in the profile of a third user of the plurality of users participating in the shared playback session. The third user is distinct from the first user and the second user. For example, as explained with reference to FIG. 2A, the electronic device determines an order of the up next shared queue 202 based on the user taste profile (e.g., user taste profile vector) of each user (e.g., user 1, user 2, and user 3) that is participating in the shared playback session. In some embodiments, the musical preferences indicated in the profile of the third user correspond to the playback history of the third user. In some embodiments, the musical preferences of the third user indicate that the third user is the most dissatisfied user in the shared playback session.

In some embodiments, the order of the shared playback queue is determined (314) based on a comparison of a cumulative dissatisfaction for first media content item among the plurality of users and a cumulative dissatisfaction for second media content item among the plurality of users. For example, as described with reference to FIG. 2A, the scores are based on the musical preferences of the users (e.g., a vector distance between the user's taste profile vector and the vector of the media content item). In some embodiments, the media content items are ordered so as to minimize the cumulative dissatisfaction of the users, by positioning media content items with lower cumulative dissatisfaction ahead of media items with higher cumulative dissatisfaction. The problem of user dissatisfaction in shared playback session comprising user-added media items is solved by re-ordering the shared playback queue according to a cumulative dissatisfaction for the group of users.

In some embodiments, the order of the shared playback queue is determined (316) based on a dissatisfaction of a most-dissatisfied user of the plurality of users. For example, in FIG. 2A, the third user is the most dissatisfied (e.g., cumulative score is the largest). In some embodiments, the order is determined based on the satisfaction of a subset, less than all, of the plurality of users. For example, the subset includes at least one user (e.g., the subset comprises the most dissatisfied users). For example, the order is determined based on minimizing the cumulative score for both user 1 and user 3 (e.g., without minimizing the score for user 2, because user 2 is the most satisfied user). The problem of user dissatisfaction in shared playback session comprising user-added media items is solved by re-ordering the shared playback queue to minimize the dissatisfaction of a least satisfied user.

In some embodiments, the order of the shared playback queue is determined (318) based on a comparison of a cumulative satisfaction for first media content item among the plurality of users and a cumulative satisfaction for second media content item among the plurality of users. For example, as described with reference to FIG. 2A, the cumulative score 204 is used to determine the order of presentation of the up next shared queue 202. In some embodiments, the items are ordered so as to maximize the cumulative satisfaction of the users, by positioning media content items with higher cumulative satisfaction ahead of media items with lower cumulative satisfaction. The problem of user dissatisfaction in shared playback session comprising user-added media items is solved by re-ordering the shared playback queue according to a cumulative satisfaction for the group of users.

In some embodiments, for each respective user of a plurality of users participating in the shared playback session, the indication of the musical preferences of the respective user comprises (320) a respective vector in a vector space. In some embodiments, the first media content item is represented by a first vector in the vector space. In some embodiments, the second media content item is represented by a second vector in the vector space. In some embodiments, determining the order of the shared playback queue comprises comparing the first vector and the second vector to the respective vector representing the third user. For example, the first vector and the second vector are compared to determine which vector more closely aligns with the vector indicating the musical preferences of the user. The problem of determining users' satisfactions with a given media item is solved by representing users and media items as vectors in the same vector space.

In some embodiments, determining the order of the shared playback queue comprises (322): determining a cumulative score for each user, the cumulative score reflecting a sum of respective vector distances calculated between respective media content items presented in the shared playback queue and the respective user, comparing the respective cumulative scores for each respective user to identify a user with the largest cumulative score (e.g., the most dissatisfied user), and ordering the shared playback queue so as to present a media content item requested by the identified user as the next media content item to be played. For example, cumulative score 204 is calculated for each user participating in the shared playback session in FIG. 2A. The problem of determining users satisfactions with a set of media item is solved by representing users and media items as vectors in the same vector space, and calculating a cumulative vector distance between the user and the media items.

In some embodiments, the vector distance represents (324) a satisfaction of the user for the respective media content item.

In some embodiments, the vector representing a respective media content item is based on (326) one or more of: a degree to which a media content item is acoustic, a strength of a beat, a degree to which a media content item sounds choppy, suitability for dancing, positions of a media content item where downbeats occur, duration of a media content item, average dynamic range, a measure of energy of a media content item, a degree to which the twelve pitches are balanced, a degree to which a media content item contains vocals, key, a degree to which a live audience is present, loudness, a degree of consistency of timing, fade-in point, fade-out point, modal scale, suitability for running, a degree to which a media content item includes spoken words, tempo, time signature, and a degree to which a media content item is cheerful. For example, the vector space is defined by a plurality of features. Each media content item is represented by a vector in the vector space. As explained above, a user is also represented by a vector in the vector space based on the user's taste profile.

In some embodiments, the vector for each user is based on (328) a playback history of the user. For example, a user's taste profile is determined based on media content items that the user has previously consumed. In some embodiments, the playback history of the user represents the media content items that are consumed over a predetermined time period, such as 90 days. For example, the vector for each user is a vector sum or norm of the media items in the users playback history. The problem of how to represent users and media items in the same vector space is solved generating vector representations of users using their respective playback histories.

In some embodiments, the vector for each user represents (330) an average taste of the user for media content.

The electronic device provides (332), for playback in the shared playback session, the first media content item and the second media content item based on the order of the shared playback queue. For example, as described with reference to FIG. 2A, the shared listening session presents media content item 231 and then presents media content item 233 to the users participating in the shared playback session. The problem of a few users in a shared playback session adding more than their fair share of songs is solved by re-ordering the shared playback queue to take into account other user's musical preferences, and presenting the re-ordered playback queue.

In some embodiments, after the media content items included in the shared playback queue have been provided, without user intervention, the electronic device adds additional media content items to the shared playback queue. For example, the electronic device automatically (e.g., without being requested by a user) selects media content items and puts them in the shared playback queue. In some embodiments, the additional media content items are not selected by a user of the shared playback session (e.g., in any of the user queues). In some embodiments, the additional media content items are selected based on one or more media content items that have already been presented in the shared playback session. For example, the additional media content items share a characteristic (e.g., context) with one or more media content items that were added to the shared playback queue by a user. In some embodiments, the additional media content items represent a context (e.g., if a user adds a media content item (e.g., selected from another non-user-selected playback queue (e.g., album or computer generated playlist), the context is the rest of the album or playlist).

Although FIGS. 3A-3C illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

Figure 4:
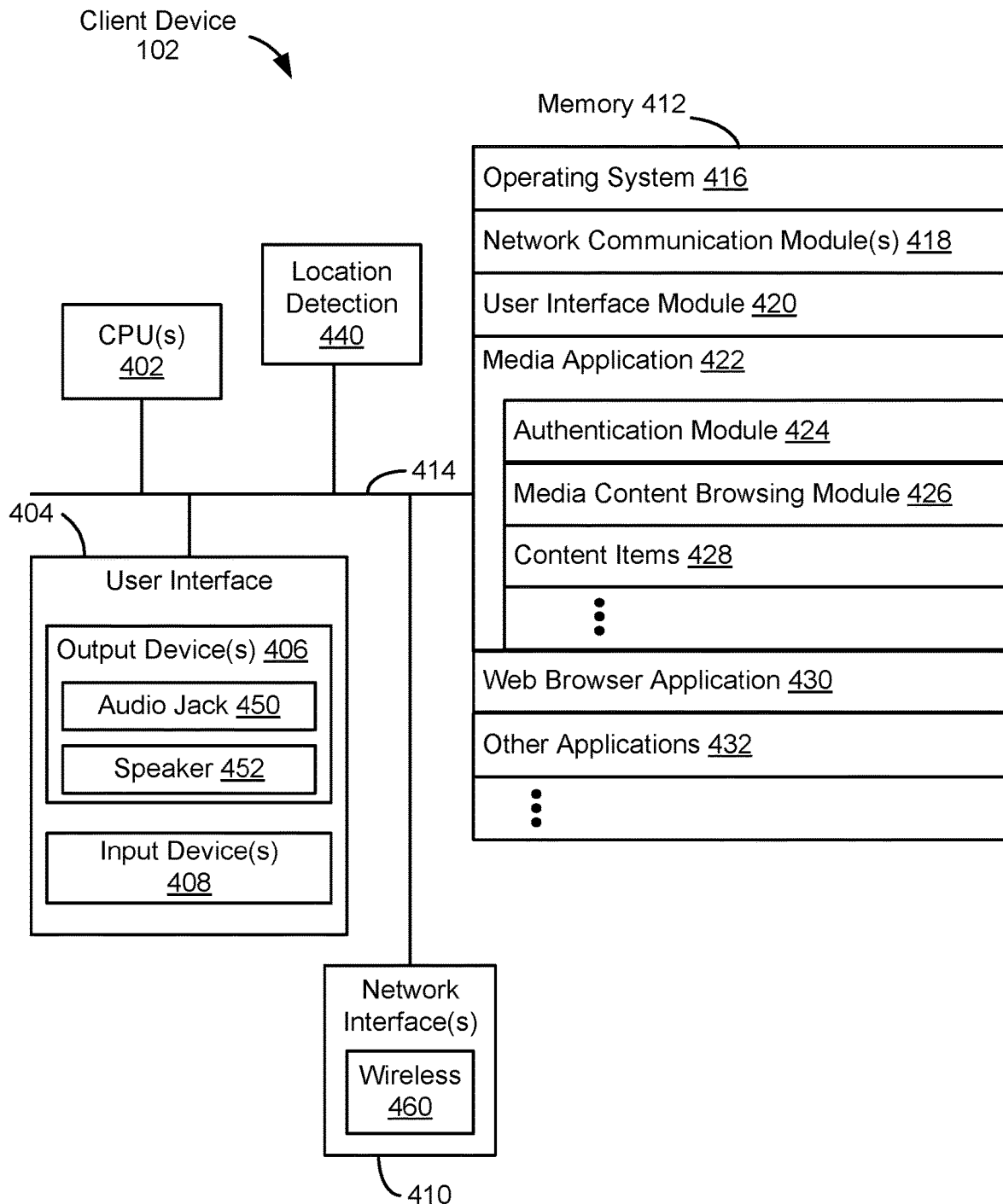
FIG. 4 is a block diagram illustrating a client device in accordance with some embodiments.

FIG. 4 is a block diagram illustrating a client device 102 (e.g., client device 102-1 and/or client device 102-$m$, FIG. 1) in accordance with some embodiments. The client device 102 includes one or more central processing units (CPU(s), i.e., processors or cores) 402, one or more network (or other communications) interfaces 410, memory 412, and one or more communication buses 414 for interconnecting these components. The communication buses 414 optionally include circuitry (sometimes called a chipset) that interconnects and controls communications between system components.

The client device 102 includes a user interface 404, including output device(s) 406 and input device(s) 408. In some embodiments, the input devices 408 include a keyboard, mouse, or track pad. Alternatively, or in addition, in some embodiments, the user interface 404 includes a display device that includes a touch-sensitive surface, in which case the display device is a touch-sensitive display. "User input," as described herein, may refer to a contact detected with a touch-sensitive display and/or an input by an input device 408. In some embodiments, the output devices (e.g., output device(s) 406) include a speaker 452 (e.g., speakerphone device) and/or an audio jack 450 (or other physical output connection port) for connecting to speakers, earphones, headphones, or other external listening devices. Furthermore, some client devices 102 use a microphone and voice recognition device to supplement or replace the keyboard. Optionally, the client device 102 includes an audio input device (e.g., a microphone) to capture audio (e.g., speech from a user).

Optionally, the client device 102 includes a location-detection device 440, such as a global navigation satellite system (GNSS) (e.g., GPS (global positioning system), GLONASS, Galileo, BeiDou) or other geo-location receiver, and/or location-detection software for determining the location of the client device 102 (e.g., module for finding a position of the client device 102 using trilateration of measured signal strengths for nearby devices).

In some embodiments, the one or more network interfaces 410 include wireless and/or wired interfaces for receiving data from and/or transmitting data to other client devices 102, media presentations systems 108, a media content server 104, and/or other devices or systems. In some embodiments, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some embodiments, data communications are carried out using any of a variety of custom or standard wired protocols (e.g., USB, Firewire, Ethernet, etc.). For example, the one or more network interfaces 410 include a wireless interface 460 for enabling wireless data communications with other client devices 102, media presentations systems 108, and/or or other wireless (e.g., Bluetooth-compatible) devices (e.g., for streaming audio data to the media presentations system 108 of an automobile). Furthermore, in some embodiments, the wireless interface 460 (or a different communications interface of the one or more network interfaces 410) enables data communications with other WLAN-compatible devices (e.g., a media presentations system 108) and/or the media content server 104 (via the one or more network(s) 112, FIG. 1).

In some embodiments, client device 102 includes one or more sensors including, but not limited to, accelerometers, gyroscopes, compasses, magnetometer, light sensors, near field communication transceivers, barometers, humidity sensors, temperature sensors, proximity sensors, range finders, and/or other sensors/devices for sensing and measuring various environmental conditions.

Memory 412 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 412 may optionally include one or more storage devices remotely located from the CPU(s) 402. Memory 412, or alternately, the non-volatile memory solid-state storage devices within memory 412, includes a non-transitory computer-readable storage medium. In some embodiments, memory 412 or the non-transitory computer-readable storage medium of memory 412 stores the following programs, modules, and data structures, or a subset or superset thereof:

- an operating system 416 that includes procedures for handling various basic system services and for performing hardware-dependent tasks;
- network communication module(s) 418 for connecting the client device 102 to other computing devices (e.g., media presentation systems 108, media content server 104, and/or other client devices) via the one or more network interface(s) 410 (wired or wireless) connected to one or more network(s) 112;
- a user interface module 420 that receives commands and/or inputs from a user via the user interface 404 (e.g., from the input devices 408) and provides outputs for playback and/or display on the user interface 404 (e.g., the output devices 406);
- a media application 422 (e.g., an application associated with and for accessing a content (i.e., media-providing) service provided by a media content provider such as media content server 104, including a media player, a streaming media application, or any other appropriate application or component of an application) for browsing, receiving, processing, presenting, and requesting playback of media (e.g., media items). The media application 422 is also used to monitor, store, and/or transmit (e.g., to media content server 104) data associated with user behavior. The media application 422 may include a content-personalization module (e.g., analogous to the content personalization module 524, FIG. 5) and also includes the following modules (or sets of instructions), or a subset or superset thereof:
  - an authentication module 424 for sending authentication tokens corresponding to one or more media presentation systems associated with the client device 102 (e.g., one or more of the media presentation systems 108 from FIG. 1), receiving authentication tokens from other devices, and/or generating authentication tokens for media presentation systems associated with client device 102;
  - a media content browsing module 426 for providing controls and/or user interfaces enabling a user to navigate, select for playback, and otherwise control or interact with media content, whether the media content is stored or played locally or remotely;
  - a content items module 428 for storing media items for playback, including storing a playback queue such as the shared playback queue 103;
- a web browser application 430 (e.g., Internet Explorer or Edge by Microsoft, Firefox by Mozilla, Safari by Apple, or Chrome by Google) for accessing, viewing, and interacting with web sites; and
- other applications 432, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

In some embodiments, the media presentation system 108 is a type of client device 102, and includes some or all of the same components, modules, and sub-modules as described above in FIG. 4 with respect to the client device 102.

Figure 5:
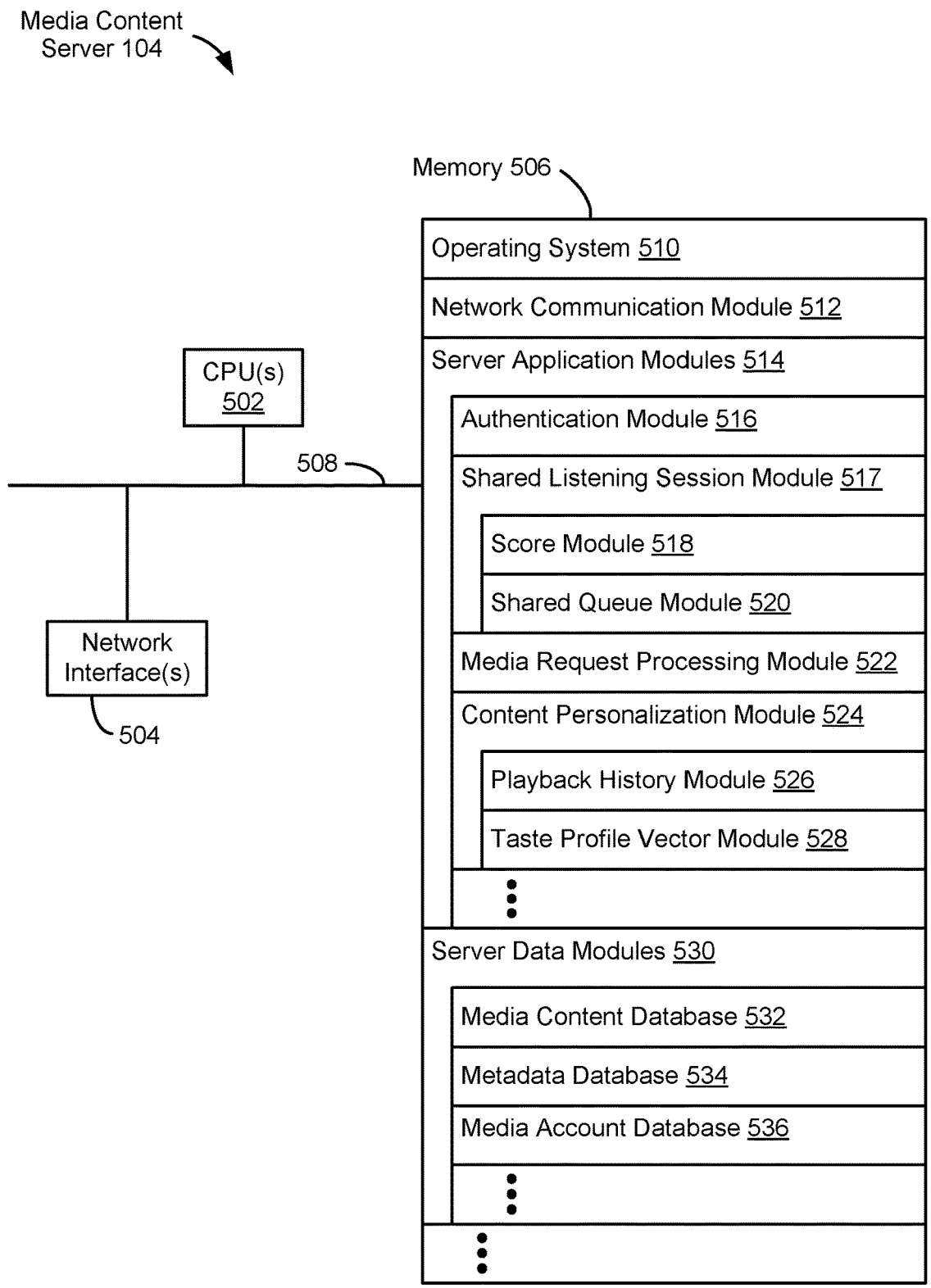
FIG. 5 is a block diagram illustrating a media content server in accordance with some embodiments.

FIG. 5 is a block diagram illustrating a media content server 104 in accordance with some embodiments. The media content server 104 typically includes one or more central processing units/cores (CPUs) 502, one or more network interfaces 504, memory 506, and one or more communication buses 508 for interconnecting these components.

Memory 506 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 506, optionally, includes one or more storage devices remotely located from one or more CPUs 502. Memory 506, or, alternatively, the non-volatile solid-state memory device(s) within memory 506, includes a non-transitory computer-readable storage medium. In some embodiments, memory 506, or the non-transitory computer-readable storage medium of memory 506, stores the following programs, modules and data structures, or a subset or superset thereof:

- an operating system 510 that includes procedures for handling various basic system services and for performing hardware-dependent tasks;
- a network communication module 512 that is used for connecting the media content server 104 to other computing devices via one or more network interfaces 504 (wired or wireless) connected to one or more networks 112;
- one or more server application modules 514 for performing various functions with respect to providing and managing a content service, the server application modules 514 including, but not limited to, one or more of:
  - an authentication module 516 for managing authentication and/or authorization requests;
  - a shared listening session module 517 for initiating and/or maintaining shared listening sessions, including, but not limited to, one or more of:
    - a score module 518 for calculating and/or storing one or more scores (e.g., cumulative score) for each user participating in the shared listening session; and
    - a shared queue module 520 for generating and/or updating the shared playback queue based on requests received from the users participating in the shared listening session, including determining an order of requested media content items included in the shared queue; and a media request processing module 522 for processing requests for media content and facilitating access to requested media items by client devices (e.g., the client device 102) including, optionally, streaming media content to such devices and/or to one or more media presentation systems 108;

a content personalization module 524 for providing personalized content (e.g., playlists, tracks, advertisements, tooltips, notifications, etc.) to users of the content service, including, but not limited to, one or more of:

a playback history module 526 for processing (e.g., compiling) and storing data (e.g., in a playback history) relating to media content items that a user has consumed from the media-providing service (e.g., each user of the media-providing service has at least one playback history); and a taste profile vector module 528 for processing (e.g., identifying and/or compiling) taste profiles (e.g., indicating user preferences for media content) for users of the media-providing service based on characteristics of the media content items included in the playback history of the respective user, including determining a vector to represent the taste profile;

one or more server data module(s) 530 for handling the storage of and access to media items and metadata relating to the media items; in some embodiments, the one or more server data module(s) 530 include:

a media content database 532 for storing media items (e.g., audio files, video files, text files, etc.);

a metadata database 534 for storing metadata relating to the media items; and a media account database 536 for storing account information for user media accounts, including user profiles, credentials (e.g., user identifiers, passwords, email addresses, etc.), credentials or identifiers of any linked accounts, and the like.

In some embodiments, the media content server 104 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above identified modules stored in memory 412 and 506 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various embodiments. In some embodiments, memory 412 and 506 optionally store a subset or superset of the respective modules and data structures identified above. Furthermore, memory 412 and 506 optionally store additional modules and data structures not described above. In some embodiments, modules stored in memory 412 may also be stored in memory 506 (and vice-versa). For example, the shared queue module 520 may be stored at the media content server 104 in memory 506 and/or stored in memory 412 at the client device 102.

Although FIG. 5 illustrates the media content server 104 in accordance with some embodiments, FIG. 5 is intended more as a functional description of the various features that may be present in one or more media content servers than as a structural schematic of the embodiments described herein. In practice, and as recognized by those of ordinary skill in the art, items shown separately could be combined and some items could be separated. For example, some items shown separately in FIG. 5 could be implemented on single servers and single items could be implemented by one or more servers. The actual number of servers used to implement the media content server 104, and how features are allocated among them, will vary from one embodiment to another and, optionally, depends in part on the amount of data traffic that the server system handles during peak usage periods as well as during average usage periods.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A method, comprising:

at an electronic device having one or more processors and memory storing one or more programs for execution by the electronic device:

storing, for each respective user of a plurality of users participating in a shared playback session, a profile for the respective user that includes an indication of musical preferences of the respective user;

storing a shared playback queue for the shared playback session, the shared playback queue comprising one or more media content items, including a first media content item requested by a first user of the plurality of users, while the shared playback queue includes the first media content item, receiving a second request, from a second user of the plurality of users, to add a second media content item to the shared playback queue;

determining an order of the shared playback queue based at least in part on the musical preferences indicated in the profile of a third user of the plurality of users participating in the shared playback session, wherein the third user is distinct from the first user and the second user; and providing, for playback in the shared playback session, the first media content item and the second media content item based on the order of the shared playback queue.

2. The method of claim 1, wherein the order of the shared playback queue is determined based on a comparison of a cumulative dissatisfaction for the first media content item among the plurality of users and a cumulative dissatisfaction for the second media content item among the plurality of users.

3. The method of claim 1, wherein the order of the shared playback queue is determined based on a dissatisfaction of a most-dissatisfied user of the plurality of users.

4. The method of claim 1, wherein the order of the shared playback queue is determined based on a comparison of a cumulative satisfaction for the first media content item among the plurality of users and a cumulative satisfaction for the second media content item among the plurality of users.

5. The method of claim 1, wherein:
for each respective user of a plurality of users participating in the shared playback session, the indication of the musical preferences of the respective user comprises a respective vector in a vector space;
the first media content item is represented by a first vector in the vector space;
the second media content item is represented by a second vector in the vector space; and
determining the order of the shared playback queue comprises comparing the first vector and the second vector to the respective vector representing the third user.

6. The method of claim 5, wherein determining the order of the shared playback queue comprises:
determining a cumulative score for each user, the cumulative score reflecting a sum of respective vector distances calculated between respective media content items presented in the shared playback queue and the respective user;
comparing the respective cumulative scores for each respective user to identify a user with the largest cumulative score; and
ordering the shared playback queue so as to present a media content item requested by the identified user as the next media content item to be played.

7. The method of claim 6, wherein the vector distance represents a satisfaction of the user for the respective media content item.

8. The method of claim 5, wherein the vector representing a respective media content item is based on one or more of: a degree to which a media content item is acoustic, a strength of a beat, a degree to which a media content item sounds choppy, suitability for dancing, positions of a media content item where downbeats occur, duration of a media content item, average dynamic range, a measure of energy of a media content item, a degree to which the twelve pitches are balanced, a degree to which a media content item contains vocals, key, a degree to which a live audience is present, loudness, a degree of consistency of timing, fade-in point, fade-out point, modal scale, suitability for running, a degree to which a media content item includes spoken words, tempo, time signature, and a degree to which a media content item is cheerful.

9. The method of claim 5, wherein the vector for each user is based on a playback history of the user.

10. The method of claim 5, wherein the vector for each user represents an average taste of the user for media content.

11. The method of claim 1, wherein each media content item in the shared playback queue is associated with a respective user.

12. An electronic device, comprising:
one or more processors; and
memory storing one or more programs for execution by the electronic device for:
storing, for each respective user of a plurality of users participating in a shared playback session, a profile for the respective user that includes an indication of musical preferences of the respective user;
storing a shared playback queue for the shared playback session, the shared playback queue comprising one or more media content items, including a first media content item requested by a first user of the plurality of users,
while the shared playback queue includes the first media content item, receiving a second request, from a second user of the plurality of users, to add a second media content item to the shared playback queue;
determining an order of the shared playback queue based at least in part on the musical preferences indicated in the profile of a third user of the plurality of users participating in the shared playback session, wherein the third user is distinct from the first user and the second user; and
providing, for playback in the shared playback session, the first media content item and the second media content item based on the order of the shared playback queue.

13. A non-transitory computer-readable storage medium having one or more processors and memory storing one or more programs for execution by an electronic device for:
storing, for each respective user of a plurality of users participating in a shared playback session, a profile for the respective user that includes an indication of musical preferences of the respective user;
storing a shared playback queue for the shared playback session, the shared playback queue comprising one or more media content items, including a first media content item requested by a first user of the plurality of users,
while the shared playback queue includes the first media content item, receiving a second request, from a second user of the plurality of users, to add a second media content item to the shared playback queue;
determining an order of the shared playback queue based at least in part on the musical preferences indicated in the profile of a third user of the plurality of users participating in the shared playback session, wherein the third user is distinct from the first user and the second user; and
providing, for playback in the shared playback session, the first media content item and the second media content item based on the order of the shared playback queue.

14. The electronic device of claim 12, wherein the order of the shared playback queue is determined based on a comparison of a cumulative dissatisfaction for the first media content item among the plurality of users and a cumulative dissatisfaction for the second media content item among the plurality of users.

15. The electronic device of claim 12, wherein the order of the shared playback queue is determined based on a dissatisfaction of a most-dissatisfied user of the plurality of users.

16. The electronic device of claim 12, wherein the order of the shared playback queue is determined based on a comparison of a cumulative satisfaction for the first media content item among the plurality of users and a cumulative satisfaction for the second media content item among the plurality of users.

17. The electronic device of claim 12, wherein:
for each respective user of a plurality of users participating in the shared playback session, the indication of the musical preferences of the respective user comprises a respective vector in a vector space;

the first media content item is represented by a first vector in the vector space;
the second media content item is represented by a second vector in the vector space; and
determining the order of the shared playback queue comprises comparing the first vector and the second vector to the respective vector representing the third user.

18. The electronic device of claim 17, wherein determining the order of the shared playback queue comprises:
    determining a cumulative score for each user, the cumulative score reflecting a sum of respective vector distances calculated between respective media content items presented in the shared playback queue and the respective user;
    comparing the respective cumulative scores for each respective user to identify a user with the largest cumulative score; and
    ordering the shared playback queue so as to present a media content item requested by the identified user as the next media content item to be played.

19. The electronic device of claim 18, wherein the vector distance represents a satisfaction of the user for the respective media content item.

20. The electronic device of claim 17, wherein the vector representing a respective media content item is based on one or more of: a degree to which a media content item is acoustic, a strength of a beat, a degree to which a media content item sounds choppy, suitability for dancing, positions of a media content item where downbeats occur, duration of a media content item, average dynamic range, a measure of energy of a media content item, a degree to which the twelve pitches are balanced, a degree to which a media content item contains vocals, key, a degree to which a live audience is present, loudness, a degree of consistency of timing, fade-in point, fade-out point, modal scale, suitability for running, a degree to which a media content item includes spoken words, tempo, time signature, and a degree to which a media content item is cheerful.

* * * * *